United States Patent
Rock et al.

(10) Patent No.: US 7,455,870 B2
(45) Date of Patent: Nov. 25, 2008

(54) COLD PROCESS, OVEN STABLE FRUIT PASTE AND METHOD OF MAKING SUCH PASTE

(75) Inventors: Jonathan D. Rock, Medina, OH (US); John P. Hansen, Wadsworth, OH (US)

(73) Assignee: The J.M. Smucker Company, Orrville, OH (US)

( * ) Notice: Subject to any disclaimer, the term of this patent is extended or adjusted under 35 U.S.C. 154(b) by 536 days.

(21) Appl. No.: 10/375,568

(22) Filed: Feb. 26, 2003

(65) Prior Publication Data

US 2003/0161928 A1    Aug. 28, 2003

Related U.S. Application Data

(60) Continuation of application No. 09/481,857, filed on Jan. 12, 2000, now abandoned, which is a continuation of application No. 09/241,627, filed on Feb. 1, 1999, now abandoned, which is a division of application No. 08/890,495, filed on Jul. 9, 1997, now Pat. No. 5,932,270.

(51) Int. Cl.
*A23L 1/39* (2006.01)
*A23L 1/0522* (2006.01)

(52) U.S. Cl. .................. 426/589; 426/639; 426/661

(58) Field of Classification Search ........... 426/661, 426/639, 589
See application file for complete search history.

(56) References Cited

U.S. PATENT DOCUMENTS

| | | | |
|---|---|---|---|
| 3,656,967 A | 4/1972 | Barton et al. | |
| 3,947,604 A * | 3/1976 | McGinley et al. | 426/573 |
| 4,444,799 A | 4/1984 | Vanderveer et al. | |
| 4,465,702 A * | 8/1984 | Eastman et al. | 426/578 |
| 4,774,095 A | 9/1988 | Kleinschmidt et al. | |
| 4,988,531 A * | 1/1991 | Moore et al. | 426/578 |
| 5,260,083 A | 11/1993 | Brain et al. | |
| 5,356,653 A | 10/1994 | Lathrop | |
| 5,607,716 A | 3/1997 | Doherty et al. | |
| 5,932,270 A | 8/1999 | Rock et al. | |
| 6,391,376 B1 | 5/2002 | Hansen et al. | |
| 6,506,436 B2 | 1/2003 | Rock et al. | |

FOREIGN PATENT DOCUMENTS

JP    407313065 A  * 12/1995

OTHER PUBLICATIONS

Product Sheet on Mira-Thik sold by A.E. Staley Manufacturing Company of Decatur, Illinois, no date known.

Product Sheet on Mira-Gel sold by A.E. Staley Manufacturing Company of Decatur, Illinois, no date known.

(Continued)

*Primary Examiner*—Helen F Pratt
(74) *Attorney, Agent, or Firm*—Calfee, Halter & Griswold LLP

(57) ABSTRACT

A cold process bake fruit paste including a fruit concentrate, water, a corn syrup sweetener, and a stabilizer system comprising a blend of first instant granular modified corn starch hydratable into a highly viscous free standing mass when exposed to free water and a second instant granular natural corn starch hydratable by free water to form a resilient, colloidal gel structure with the first and second starches hydrated after being fully dispersed in fruit paste.

43 Claims, 10 Drawing Sheets

OTHER PUBLICATIONS

Product Sheet on Binasol Starch sold by A.E. Staley Manufacturing Company of Decatur, Illinois, Copyright 2000, Tate & Lyle PLC.

Brochure on several cold process starches available from A.E. Staley Manufacturing Company of Decatur, Illinois, no date known.

* cited by examiner

COLD PROCESS, OVEN STABLE FRUIT PASTE AND METHOD OF MAKING SUCH PASTE application is a continuation of Ser. No. 09/481,857 filed Jan. 12, 2000, now abandoned, which is a continuation of Ser. No. 09/241,627 filed Feb. 1, 1999, now abandoned, which is a divisional of Ser. No. 08/890,495, filed Jul. 9, 1997 which is now U.S. Pat. No. 5,932,270.

The present invention is directed to the art of producing a food ingredient or item which is used in producing a baked product, such as a fruit filled bar or a fruit topped Danish roll and more particularly to a cold process, bake stable or oven stable fruit paste which can be stored for long periods of time, applied to a dough structure and then baked into a finished baked product.

The invention is particularly applicable for producing a fruit paste which is oven stable or baked stable to be used as an ingredient for a baked fruit product and it will be described with particular reference thereto; however, the invention is broader and may be used in some instances to produce a paste or food ingredient which is based upon a more neutral flavoring constituent, such as chocolate or caramel.

INCORPORATION BY REFERENCE

An aspect of the present invention is the blending of two instant corn starches and ultra rapidly dispersing this starch blend in a liquid phase or constituent having free water, so that the dispersion of the blend of instant starches is accomplished prior to the hydration of the starches by the available free water of the liquid phase. To accomplish this objective, in the invention, the blend of starches must be ultra rapidly dispersed within the liquid phase or component, which operation, in practice, is accomplished by use of a high speed blender of the type used to introduce dry powder into a liquid phase. Such a blender is disclosed in U.S. Pat. No. 3,606,270. This patent is incorporated by reference herein to illustrate the ultra rapid dispersion of the starch blend into the liquid phase of the food item prior to hydration of the separate starches. The blender of this patent is the general type of blender which is employed to accomplish one aspect of the present invention.

The present invention involves a blend of an instant granular modified corn starch hydratable into a highly viscous, free standing mass when exposed to free water. This type of modified starch is sold under the trademark MIRA-THIK by A.E. Staley Manufacturing Company of Decatur, Ill. A product sheet on this modified starch is incorporated by reference herein.

The invention uses a second corn starch which is an instant granular natural corn starch hydratable by free water to form a resilient, colloidal gel structure. In practice the second starch is MIRA-GEL sold by A. E. Staley Manufacturing Company of Decatur, Ill. A product sheet of this natural starch is incorporated by reference herein.

In one preferred embodiment of the present invention two texture control starches are added to the stabilizing blend of cold starches. In practice BINASOL 15 is used to add smoothness to the resulting paste. A second texture control starch is sometimes used to create the pulpy type of texture, such as found in Fig Newton bars. This texture control starch in practice is REDI-TEX. Both of these dry texture control starches, which are used in one embodiment of the invention, are sold by A. E. Staley Manufacturing Company of Decatur, Ill. and product sheets for these two texture control starches are also incorporated by reference herein.

In one aspect of the invention a colloidal grade of microcrystalline cellulose with a small amount of carboxymethyl cellulose, is used to add coherency as well as to enhance the heat stability of the inventive paste. In practice the cellulose is sold under the trademark AVICEL sold by F. M. C. Corporation. Contrary to normal use of this cellulose, the invention masticates the needle shaped particles into ultra fine particulates. A product sheet regarding this cellulose is also incorporated by reference herein.

A. E. Staley Manufacturing Company sells a number of cold process starches for the food industry and a brochure of the various starches available from A. E. Staley Manufacturing Company is incorporated by reference herein. The several product sheets do not form a part of the present invention although they do relate to constituents of the paste constructed in accordance with the present invention. They are incorporated by reference herein to define the types of constituents used in practicing the preferred embodiment of the invention.

BACKGROUND OF INVENTION

Producers of fruit pastes and other bakery fillings normally manufacture these pastes in a pumpable form using hot processing techniques. Such techniques are required especially for high solids pastes such as over 60-65% solids. Most commercial fruit pastes are of the high solids type. To produce such pastes or fillings with a high solids content, the standard technique involves heating the liquid phase and the resulting paste for the purposes of stabilizing the filling or paste so that it is oven stable or bake stable for subsequent use in a baking environment. It has been conventional wisdom that such hot processing of fruit paste to produce an oven stable or bake stable ingredient results in the best quality and a product with a superior shelf life. However, the food industry has developed an alternative process for preparing food items known as a cold process technology, which does not require the addition of any significant heat in manufacturing the end product. There are several obvious reasons why the food industry has attempted to employ a cold process technology. The addition of heat to the process, in the form of steam or electricity, requires a substantial input of energy, which is expensive. In high solids materials, i.e. above 60-65% solids, heating of the product during processing requires a substantial amount of time. Thus, time necessary for producing the product, such as a food paste, is increased when using a hot processing technique. In addition, some food products, such as fruit paste used in bakery products lose some of their fresh taste characteristics by long time exposure to heat before the baking operation. Some products take on the characteristics of a cooked fruit product, when a natural or uncooked physical property is required for the end product. Fruit pastes, and other food products, which have added flavoring and color pigmentation to enhance the taste and appearance of the end product have these characteristics diminished by using the hot processing technique. In most instances, fruit pastes, fillings and other similar products are to be stored and shipped for subsequent use. Consequently, they must be cooled prior to packing and then reconstituted to the desired characteristics of the fruit product at the bakery. This added process operation increases the processing time and increases the equipment required for producing a bake stable fruit paste. When the paste is cooled subsequent to a hot processing operation and prior to packing for storage and shipment, added time and equipment are required. This expense is not justified by enhanced characteristics of the paste.

There is an effort under way to produce fruit based paste for bakery applications using a cold process technology. Since the most important function of the fruit paste produced by the cold process technology is the bake stability of the paste, the cold process technology must produce a product that can withstand temperatures of a baking operation without negatively affecting the baked product. The cold process technology must be designed to control the spread of the filling or paste as it is heated. In the past, it has been recognized that the oven stability or bake stable characteristic of the fruit paste or filling is affected by the stabilizer used in the paste or filling and the amount of solids in the paste or filling. The stabilizer for the high solids paste or fillings, which could be used in the cold processing technology, was alginates. When using alginates for a stabilizer in the cold process technology, the fruit paste or filling formed into a gel which was somewhat chunky. This was especially true at high solids levels. The gel matrix using an alginate inhibited heat transfer through the filling or paste to increase bake stability; however, alginate gels did have the limitation of being chunky and unable to exhibit a creamy texture or a controlled texture for the filling or paste. The final texture of the paste was not controllable and was always chunky. Indeed, the alginate gels could form properly in only acid environments, which somewhat limited the taste or flavor constituents which could be used in the filling or paste. Such cold processes could not be used for chocolate or carmel which does not have the acid characteristics of a fruit based filling or paste.

At this time the commercial cold process for fruit based fillings and paste involves the use of alginate stabilizer, which forms a chunky constituency caused by a gel structure. Consequently, there can be no control over the texture and consistency of the end product. The consistency and texture of the end product, when using cold processing for a fruit filling or paste, is dictated by the alginate gel characteristics, which are not completely satisfactory even though they can be used when the fruit filling is to be baked within the confines of a dough structure. This prior fruit paste was used as the internal filling for a fruit bar. There is no cold process that has the ability to adjust the texture and consistency of a filling or paste that is bake stable at high solids content and that can be used for both acid and neutral pastes. Consequently, the cold process technology with its economic advantages, is seriously limited when applied to oven stable or bake stable fillings or paste used as fillings or toppings for baked products, especially when the paste or filling must have a high solids content. Such high solids pastes have high corn syrup and high levels of fruit and are normally used in quality baked products.

THE PRESENT INVENTION

There is a substantial need for an oven stable or bake stable filling or paste produced by a cold process technology and allowing control of the constituency and texture of the filling or paste while accommodating both high solids content and flavoring or taste agents with various pH levels. The present invention relates to a cold process technology for producing fruit based, bake stable, texture controlled filling or paste for use in baked products. A filling or paste formed in accordance with the present invention is capable of being formed by a cold process technology and produces a filling or paste with the desired smooth texture, which paste is still bake stable.

In practice, bake stability of a paste or filling is tested by molding a selected volume of the filling or paste, approximately ten grams, into a disk which is approximately 8 mm in height and has a diameter of 36 mm. The disk of filling or paste is placed upon a metal sheet and the mold ring forming the disk is removed. The sheet is heated to 400° F. in a conventional oven. The filling or paste on the metal sheet is heated for at least ten minutes. The molded disk is then measured with a caliper to determine the amount of spread of the filling or paste after being heated at 400° F. for ten minutes. The filling or paste constituted in accordance with the present invention can be cold processed and still meet the stringent heat stability test by drooping less than 2-3%. Indeed, in most instances there is not perceptible spread or droop of the paste during this standard testing. A paste made in accordance with the invention meets this test and allows control of the texture of the paste or filling and use of various flavor agents. This is the advantage of the present invention. In addition, the bake stability is maintained at high solids content, i.e. about 60-65%.

The bake stability and other characteristics of the present invention, such as controlling the texture and consistency of the paste or filling, is accomplished in the present invention by the use of two granular instant starches, which starches do not require heat to be hydrated. They are set by exposure to free water. The two starches involve a thickening starch and a gelling starch, which two starches are added to the paste separately as a blend and are incorporated in various ratios dependent upon the characteristics desired for the final paste. Consequently, by the use of the present invention, the two starches can be adjusted to dictate the consistency and texture of the filling or paste constructed in accordance with the present invention. The thickening starch is a natural starch and the gel starch is a modified starch. The critical aspect of the present invention is the use of the two instant corn starches, one having a thickening characteristic and the other having a gelling characteristic, which starches can be adjusted to control physical characteristics of the final paste or filling. The ratio of the starches is determined by the application and characteristics of the desired end product. It has been found that these two starches must be dispersed within the liquid phase or liquid constituent of the paste or filling prior to the time that the starches are hydrated by free water. Otherwise, the end result does not give the texture control and heat stability demanded by a filling or paste to be used as a bake stable food ingredient for a baked food product. A characteristic of the paste or filling constructed in accordance with the cold process of the present invention is that the paste or filling, when using more gelling starch, can form a skin during the baking process so that a roller or other equipment surface contacting the exposed paste or filling will not cause pick-up of paste. In addition, paste or filling constructed in accordance with the present invention is pumpable or can flow through a gravity depositor onto the bake product prior to the baking operation; however, the viscosity of the paste or filling remains substantially constant during the heating process so that the filling or paste does not spread during the baking operation.

In accordance with another aspect of the present invention, microcrystalline cellulose with a-small amount of carboxymethyl cellulose is added to the liquid phase after being particulated in a high speed, high shear mixer. This cellulose is masticated to a small size of strands less than one micron in length. By ultra fine particulation of the cellulose, the cellulose can be evenly dispersed throughout the liquid phase or liquid constituent of the filling or paste during cold processing without affecting viscosity while the fiber material of the cellulose forms mechanical links in the mass of the filling or paste. The cellulose also limits the heat transfer through the stable mass of filling or paste, without actually adding to the viscosity of the filling or paste. By highly particulating the microcrystalline cellulose into ultra fine needle like particles and fully dispersing these small particles throughout the liquid phase of the filling or paste prior to ultra rapid dispersing of the starch blend stabilizer into the liquid phase, the ultra fine cellulose particles create a linking effect that does not increase the viscosity, but does enhance firmness and the bake stability of the filling or paste constructed in accordance with the present invention.

Although the present invention has primary application for use with high solids fillings or pastes, it has been found that the ultra rapid dispersion of the starch blend can be used for low solids fillings or paste since the high speed dispersion of the starch blend is done before the large quantity of free water can set the separate starches. The invention is more applicable to pastes or fillings with over 65% solids since these products have been the most difficult to produce in a smooth or creamy form while being oven stable or bake stable. If a higher viscosity is required for the paste or filling constructed in accordance with the present invention, this paste or filling must still meet the stringent bake test as described above. This is accomplished by employing the two separate instant cold starches forming an aspect of the present invention with other cold process starches. These additional starches add viscosity and/or texture to the paste or filling.

The present invention relates to the composition of a filling or paste, which composition is accomplished by a cold process technology. The invention involves the use of two instant starches, wherein one starch is a thickening starch and the other starch is a gelling starch. These two starches are formed into a dry blend at a ratio which determines the consistency of the end product. This two starch blend is dispersed within the liquid phase or component of the filling or paste prior to the time of hydrogenation of the individual instant starches. The subsequent setting of the dispersed blend produces a novel food ingredient. This food ingredient is produced by a cold process technology wherein the two starches are used as a dry component. Of course, the two starches can be dispersed with a corn syrup which does not have free water available for hydrogenation. It has been determined that the use of low temperature corn syrup is preferred. The mix, or blend, of two starches is a dry, or substantially water free component used in the cold process technology. If microcrystalline cellulose is to be used to enhance the consistency of the product, this cellulose is masticated in water under an extremely high shear for 4-5 minutes. This action fractures the cellulose into ultra fine needle like particles, which are smaller than the normal particle size of dispersed microcrystalline cellulose. Since the microcrystalline cellulose is particulated in water, the remaining liquid material to be used in the filling or paste is added to the mixture of water and ultra finely divided microcrystalline cellulose to produce a liquid phase or component. This liquid phase is ultra rapidly combined with the dry, or substantially water free, blend of starches to produce a product which is packed immediately to accomplish the bake stability property obtainable by practicing the present invention. The ultra rapid combining of the dry, or substantially water free, starch blend and the liquid phase disperses the combined starch phase into the liquid phase prior to setting of the separate starches. Dispersion of the starches before the starch set produces bake stability in the end product as well as desired physical characteristics for this product. The paste is different than a paste which experiences setting of the starches prior to combining the starches with the liquid phase or during the time the starches are being combined with the liquid phase. The paste or filling constructed in accordance with the present invention has a unique characteristic. The gelled and set starches are hydrated after being dispersed in the liquid phase and not before dispersion or during dispersion. The novel characteristics of the paste are identifiable in the end product and results in the advantages of a paste or filling constructed in accordance with the present invention.

The present invention involves a cold process, bake stable fruit paste including a fruit, water, corn syrup and a stabilizer system comprising a blend of a first instant granular corn starch hydratable into a highly viscous, free standing mass when exposed to free water and a second instant granular natural corn starch hydratable by free water to form a resilient, colloidal gel structure with the first and second starches hydrated after being filly dispersed in the paste. By rapidly dispersing the instant granular corn starches in the liquid phase of the paste prior to hydration by the free water of the paste, a unique consistency is obtained for the paste, which consistency is controllable by the ratio of the first and second starches in the stabilizer blend. As an aspect of the invention, the second starch is the gelling starch of the stabilizer system is at least 10% of the total weight of the starch blend and preferably 10-40% of the total weight of the starch blend. The novel paste of the present invention can include a finely divided microcrystalline cellulose. Finely divided indicates that it is particulated drastically into small needle-like particles in the range of less than one micron. These particles control heat conduction through the paste, without causing a decrease in the viscosity of the paste as it is being heated during the baking operation. To increase the texture of the paste, the paste includes, a hulking agent, i.e. apple powder or dry fructose, such as KRYSTAR 300. A paste formulated in accordance with the present invention has a smooth consistency that is adjusted by changing the ratio of the thickening corn starch to the gelling corn starch. In some food products, such as Fig Newton bars, the fruit paste is modified by the inclusion of texture control cold process starches to add a pulpy consistency to the novel paste.

A paste formulated in accordance with the present invention and processed by a cold process technology is first pumpable and can be pumped to a packing station. In the packing station the paste or filling of the present invention is allowed to set. The starch blend in the paste is dispersed evenly throughout the liquid phase of the paste and is combined as a dual starch stabilizing system prior to the setting of the paste. This procedure provides the unique characteristics obtained by the present invention when using a cold process technology. A paste utilizing the present invention will allow the paste to withstand 400° F. for ten minutes with less than 5% droop and preferably less than 1% droop. This property was heretofore obtainable only by hot process technology, especially when used for a variety of pH based compositions having a high solids content. These are properties of most bake stable fruit pastes used in baked products filled by, or covered with, a fruit based food ingredient.

The invention can be defined as a cold process pumpable oven stable, fruit based food ingredient for use in producing a baked food item wherein the ingredient has a solid content of at least 60% and a water activity of less than 0.7. The paste includes a fruit concentrate, a corn syrup sweetener, a free water containing component and a stabilizing system to control the consistency, viscosity and mouth feel of the resulting paste after it is pumped and allowed to set. The set paste can also be pumped onto or into a baked product prior to the baking operation. The stabilizing system includes a blend of a first instant granular corn starch and at least 10% of a second instant granular corn starch. The first corn starch is a modified cold water thickening starch with moisture of less than 8% and a pH in the general range of 4.0-6.5. The starch is hydratable into a highly viscous, free standing mass when ultimately exposed to free water. The second starch is a natural cold water gelling starch with moisture of less than 8% and a pH in the general range of 4.0-6.5. This gelling starch is hydrated by free water to form a resilient, colloidal gel structure. By combining these two starches into a stabilizing system for the bake stable filling or paste, the consistency, flowability, viscosity and texture of the paste can be controlled. This novel stabilizing system is activated by ultra rapidly dissolving the instant starch blend in a liquid phase having free water at low temperatures before the starches are individually hydrated by the free water. The stabilizing blend of instant corn starches sets up as a blend or starch combination in the fruit based mass serving as a matrix. The paste has a consistency dependent upon the ratio of the first and second starches in the starch blend stabilizing system. This is a novel concept not heretofore used in the bake stable or oven stable food product industry.

The cold process food ingredient or paste can also include a colloidal cellulose mechanically divided at high shear to form ultra small particles so that the particles are evenly dispersed in the free water containing component of the food ingredient or paste. In practice, this colloidal cellulose is formed from a cellulose which is primarily a microcrystalline cellulose (MCC) with a small amount of carboxymethyl cellulose (CMC). In accordance with the invention, the cold process pumpable, oven stable fruit based ingredient or paste of the present invention involved dissolution of the starch blend stabilizer system into the liquid component of the paste or ingredient in a rapid process performed in less than 60 seconds and preferably between 5-30 seconds. To obtain the desired results, the blend of instant starches is set by the free water of the free water component in the paste or food ingredient after the starch blend stabilizing system is fully dispersed in the free water component of the paste or filling. After the dispersion of the stabilizer system in the paste or food ingredient, it is allowed to set to produce the novel food ingredient or paste of the present invention. This paste or food ingredient can be used for neutral acid flavoring agents, such as chocolate or caramel, and can be used for solid content as low as about 40-50% solids; however, the preferred paste food ingredient or filling is a fruit based acid formulation with a brix or solids content greater than about 65.

In accordance with another aspect of the present invention, there is provided a cold process method of forming a food ingredient or paste, which method comprises the steps of providing a component low in free water and including a blend of a first granular corn starch and at least 10% of a second granular corn starch, wherein the first granular starch is a modified cold water thickening starch with moisture of less than 8% and pH in the general range of 4.0-6.5. This starch hydrates into a highly viscous, free standing mass when ultimately exposed to free water. The second starch of the blend is a natural cold water gelling starch with moisture of less than 8% and pH in the range of 4.0-6.5. This starch hydrates to form a resilient colloidal gel structure. The inventive method involves maintaining the dry or low water component isolated from reactive free water and providing a liquid component having a sufficient free water to produce a food ingredient or paste with at least 60% solids. The liquid component also includes a high solid sweetener, a flavoring agent and a coloring agent. The dry or substantially water free component is blended into the liquid component to form a homogeneous mass in less than 60 seconds and preferably between 5-30 seconds. Thereafter, this homogenous mass of unhydrated combined starches is pumped into a holding station before the starches of the stabilizing blend are set by the free water exposed to the starches during the blending operation. Thereafter, the homogeneous mass is allowed to set so the starches of the blend set up due to the free water in the liquid component only after the starches are fully dissolved and dispersed in the liquid component to form the novel food ingredient or paste. By using this inventive method, an additional step can be provided wherein the ratio of the instant starches in the stabilizing system is adjusted to control the consistency of the food ingredient or paste produced by using the present invention. In practice, the food ingredient is a fruit puree; however, it can be chocolate or caramel, or other generally acid neutral food ingredient. The free water is controlled to create a water activity of less than 0.70.

A primary object of the present invention is the provision of a method and formulation, which method and formulation produce a bake stable food ingredient filling or paste by using a stabilizing system involving a blend of an instant modified corn starch hydratable into a thickening mass, such as a pudding, and an instant natural corn starch hydratable into a gelled colloidal structure. The method and formulation involve controlling the ratio of the two starches to give a desired consistency. The stabilizing system is dispersed in the food ingredient filling or paste prior to the hydration of the individual starches. This method uses a cold process technology and the formulation is prepared by a cold process technology to result in a novel food ingredient, filling or paste that is oven stable and pumpable onto a baked product prior to baking.

Another object of the present invention is the provision of a method and formulation, as defined above, which method and formulation not only uses cold process technology, but also results in a food ingredient, filling or paste that can be deposited onto a dough product prior to baking and is maintained on the product, or in the product, during the baking process without losing its shape, consistency or texture.

Yet another object of the present invention is the provision of a method and formulation, as defined above, which method and formulation is useful for producing a fruit based food ingredient, filling and/or paste which is oven stable, has a high solids content and has a low water activity.

Still a further object of the present invention is the provision of a method and formulation, as defined above, which method and formulation results in a product which can have an adjustable consistency. The formulation can be modified by solid flavoring agents, color agents, bulking agents and related constituents to modify the end result so long as the novel stabilizing system is maintained.

Another object of the present invention is the provision of a method and formulation, as defined above, which method and formulation produces a bake stable food ingredient, filling or paste that is less expensive and has physical characteristics at least equal to a hot process technology stable food ingredient.

Another object of the invention is the provision of a method and formulation, as described above, which method and formulation produces a smooth or creamy paste with an adjustable consistency and is bake stable even at high solids content.

These and other objects and advantages will become apparent from the following description taken together with the accompanying drawings.

PREFERRED EMBODIMENT

Figure 1:
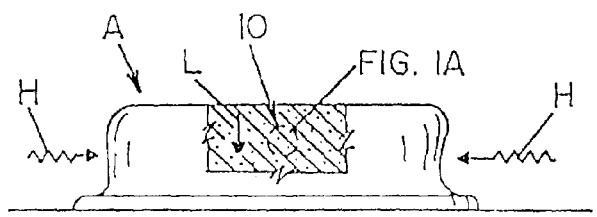
FIG. 1 is a schematic side view with a partially enlarged area illustrating schematically a heat test disk of the prior art to which the present invention is directed.
Figure 1A:
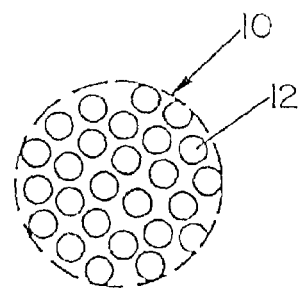

Referring now to the drawings, wherein the showings are for the purpose of illustrating preferred embodiments of the invention only and not for the purpose of limiting same, FIG. 1 shows a heat test disk A of prior fruit paste or filling which uses a gelled structure, as illustrated in enlarged area 10, and schematically represented as discrete gel particles 12. In the past, the paste was produced by a starch gel, or alginate gel, having individual particles 12 of gel solidified after hydration during the mixing process. When the gel component was used, it was standard practice to use a hot process technology for creating bake stability of test disk A. In using a cold process technology, as used with an alginate, the gel was set up into a chunky mass. Thus, disk A of the prior art either employed a hot process technology or used a gel that had a somewhat rigid consistency as represented by particles 12, to obtain bake stability. The test disk was. subjected to a temperature of approximately 400° F. for ten minutes to determine its heat stability. To assure that disk A does not droop, substantially, represented by arrow L, when subjected to such high temperatures for high solids paste, a hot process technology was used. To allow cold processing a relatively rigid gelling system such as an alginate gel was used. Both of these methods had limitations as previously discussed. There is no procedure for using cold process technology to obtain a creamy or a texture controllable or consistency controllable food ingredient, filling or paste. Introduction of heat energy into disk A during testing is represented by arrows H. When cold process technology was used, the solids content had to be reduced to below 50% to allow pumping and use of the paste with gel particle 12. High solids in the food ingredient using rigid gel particles 12 resulted in a paste structure which was rigid, chunky and difficult to control.

Figure 2:
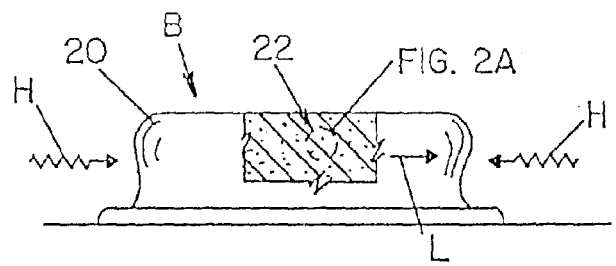
FIG. 2 is a view similar to FIG. 1 schematically illustrating a concept of the preferred embodiment of the present invention.
Figure 2A:
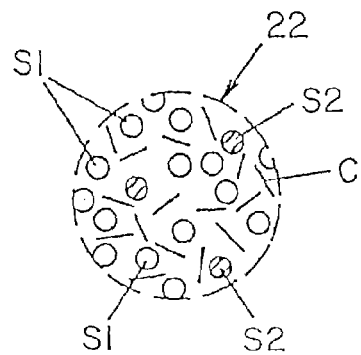
Figure 3:
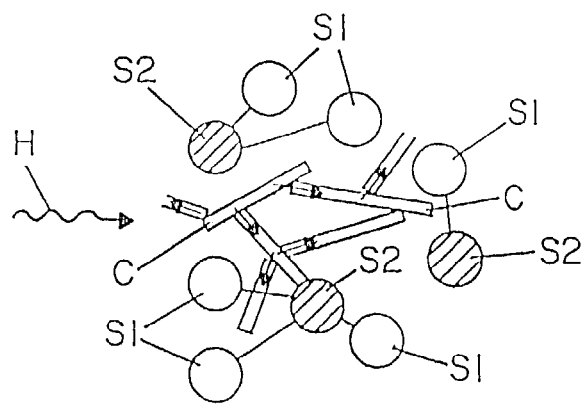
FIG. 3 is an enlarged schematic view of an aspect of the final paste produced by the present invention.

Referring now to FIGS. 2, a test disk B is a paste formulated and produced by the method of the present invention. The structure of the present invention is illustrated in the enlarged area 22, wherein the stabilizing system includes starches S1 and S2 in a liquid matrix including, in this embodiment, finely divided particles C of microcrystalline cellulose. In FIG. 3 the separate and distinct starches S1 and S2 are hydrated, as indicated by the connecting lines, into a congealed mass with a consistency and physical characteristic controlled by both starches. Particles 12 in FIG. 1 are discrete gel particles which form independently and are not dependant upon the sequence or time of gelling. If particles 12 were formed by two gelling agents, the two agents would be gelled independent of each other. Contrary to the prior gelling structure of FIG. 1, starches S1 and S2 are dispersed in the liquid phase which includes the cellulose particles C before hydration. In accordance with the invention, as described later, the combination of a dispersed blend of starches S1, S2 in the liquid phase or component of paste 20 before setting allows the paste to have a control consistency and texture based upon the ratio of the two starches. The paste maintains bake stability whereby disk B can withstand 400° F temperature for ten minutes without any substantial drooping, represented by arrow L. In FIG. 3, the gel particles S2 are combined with thickening particles S1 Heat is transferred between ultra fine particle C of cellulose to assisting heat stability.

Figure 4:
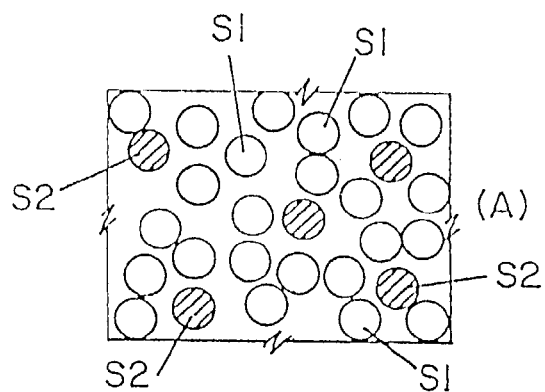
FIG. 4 is a schematic representation of the dry, or substantially water free, component used in formulating a paste in accordance with the present invention.
Figure 5:
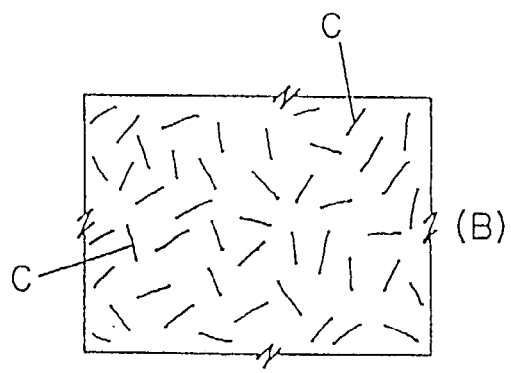
FIG. 5 is a schematic representation of the liquid phase or component with finely divided cellulose particles used in formulating a paste in accordance with the present invention.

As will be described later, a component (A) of the paste 20 is a dry component, or a liquid component with substantially free water. Component (A) includes a blend of stabilizing starches. Starch S1 and is an instant granular modified corn starch which is cold water thickened and has a moisture of less than 8% and a pH in the general range of 4.0-6.5. In practice this first cold process starch is MIRA-THIK sold by A.E. Staley Manufacturing Company of Decatur, Ill. The second starch, S2 is a granular corn starch which is a natural cold water gelling starch having moisture less than 8% and a pH in the general range of 4.0-6.5. The first starch S1 hydrates into a highly viscous, free standing mass when ultimately exposed to free water, which free water which is not available in component (A) as schematically illustrated in FIG. 4. Starch S2 gels into a resilient, colloidal gel structure when subjected to free water which is not available in component (A). The stabilizing system involves the combined use of both a thickening corn starch S1 and a gelling corn starch S2. Use of two starches allows adjustment of the texture and consistency by the ratio of these starches. In practice, starch S2 is at least 10% of the total blend of the two starches. Preferably the ratio is between 10-40% of starch S2 and the total blend of starches S1, S2. When using these two starches, hydration occurs when combining the component (A) with component (B) which includes the finely divided microcrystalline cellulose C, as schematically represented in FIG. 5. Component (A) is the liquid phase of the paste 20 and contains most of the liquid constituents. Component (A) includes of the dry constituents. Liquid component (B) has sufficient free water to ultimately create a solids content, when combined with component (A), in the general range of 65-85%. At this high solids content, the present invention produces a paste 20 which is still controllable, pumpable and smooth without sacrificing bake stability because of the use of two starches and how they are processed. It has been found in developing the present invention that a lower solids content can produce a creamy smooth paste 20; however, the paste tends to set up more rapidly and creates more process time limitations. The mixing must be done in about 10-20 seconds to assure full dispersion of component (A) into liquid component (B). The starches forming the stabilizing system of the paste will be hydrated rapidly to create the stabilizing structure of the paste because of the abundance of free water.

Figure 6:
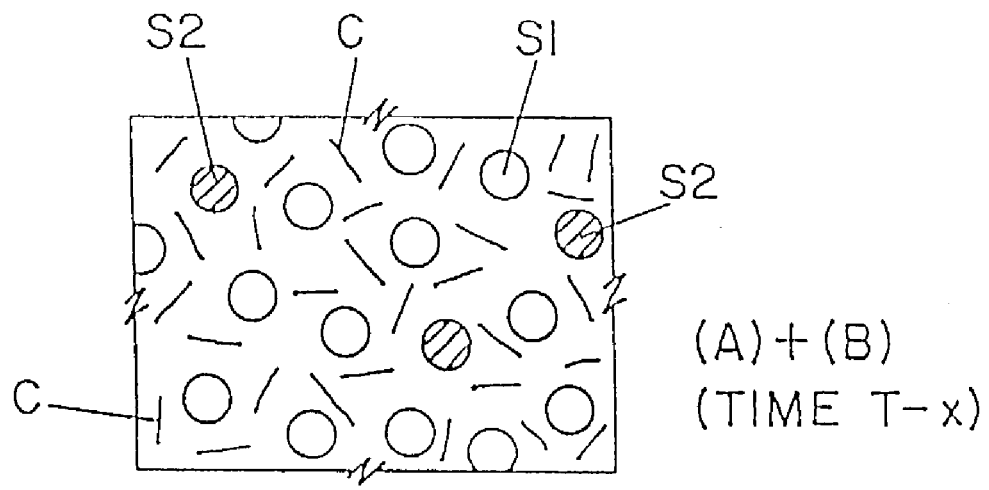
FIG. 6 is a schematic representation of a rapid dispersion of the dry, or substantially water free, component of FIG. 4 and the liquid phase or component of FIG. 5 in accordance with an aspect of the present invention.
Figure 7:
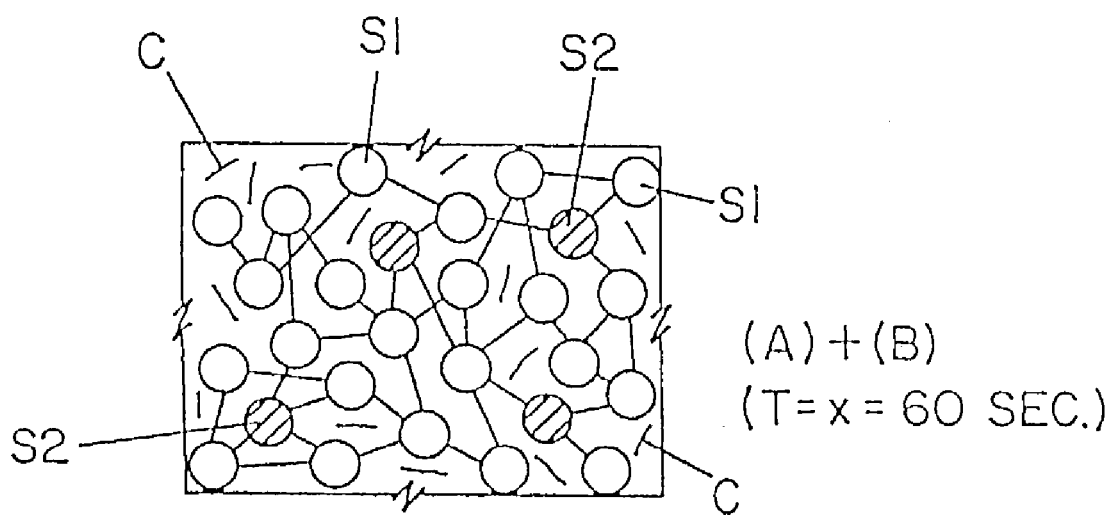
FIG. 7 is a schematic representation of the resulting paste, filling or food ingredient of the present invention after the stabilizing system of the invention has been hydrated after rapid phase dispersion, as schematically represented in FIG. 6.

In FIG. 6 there is a schematic representation a mass combining component (A) and component (B). This mass is formed before starches S1 and S2 set. Component (A) is fully dispersed in liquid component (B) before a time x, which in practice, is less than 60 seconds. By fully dispersing and distributing starches S1 and S2 into liquid phase (B) before hydration of S1 and S2, the inventive aspects of the present invention are obtained. Starches S1, S2 are set up by hydration after they have been fully dispersed within the liquid component (B), as schematically illustrated in FIG. 7. In accordance with the present invention, the stabilizing system is a blend of instant corn starches, one being a thickening starch and the other being a gelling starch. Use of these starches as the stabilizing system results in a stable pumpable, freely workable paste 20, so long as the stabilizing system is isolated from a substantial amount of free water until it has been fully dispersed in a liquid phase (B). Hydration must occur after dispersion of the stabilizing system in the mass of paste 20.

Figure 8:
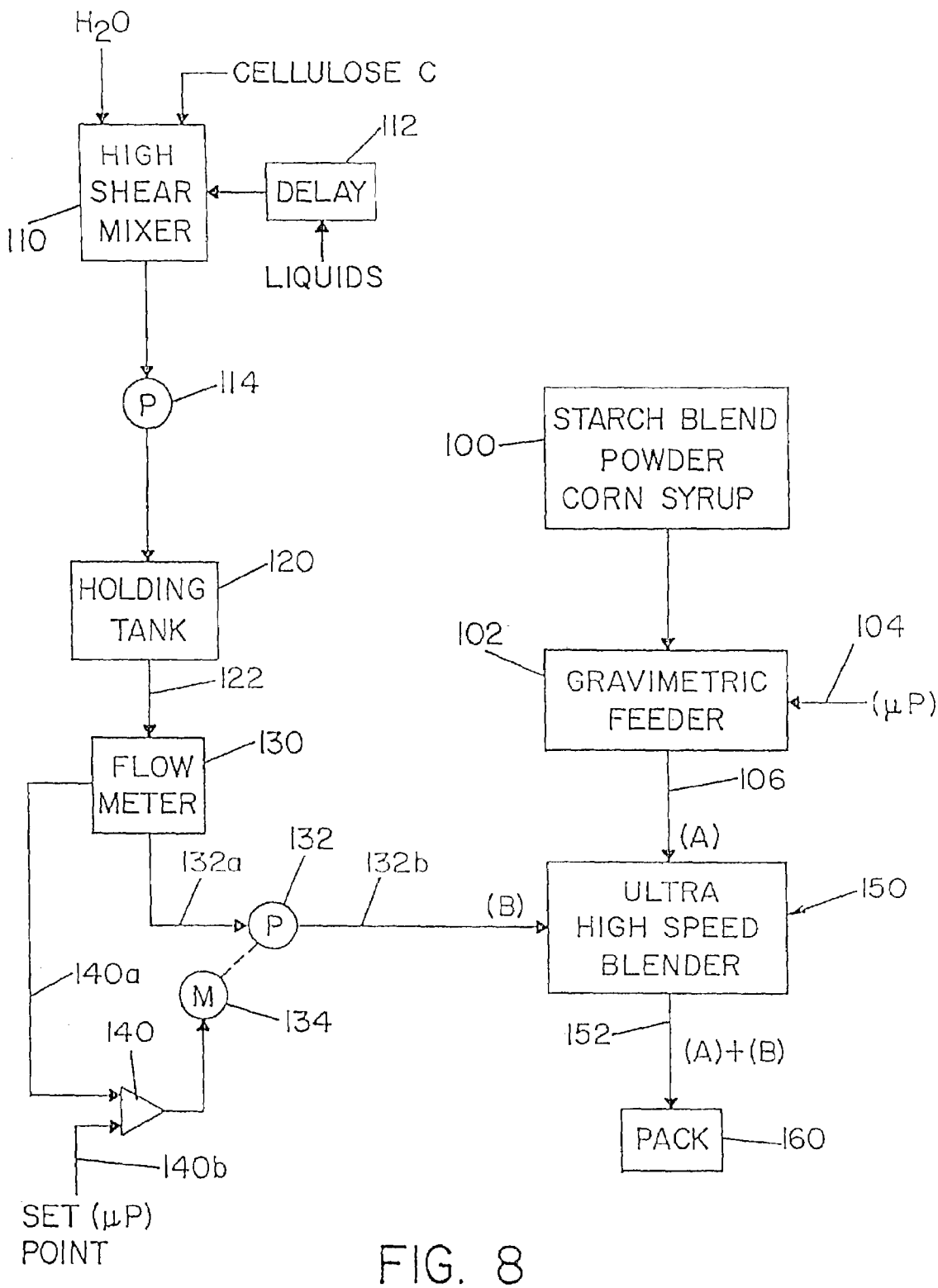
FIG. 8 is a combined block diagram and flow chart illustrating the preferred embodiment of the method used to produce the structure as schematically illustrated in FIGS. 1-7.

Production of paste 20 is accomplished by the method and procedure set forth in FIG. 8, wherein a mixer 100 receives the starch blend including dry starches S1, S2 together with apple powder and other dry ingredients, such as dry fructose corn syrup. These dry elements are mixed by mixer 100 to form a substantially dry component free of water. If other dry starches are to be used in the formulation to produce paste 20, they are added to mixer 100. Gravimetric feeder 102 feeds the dry component at a rate determined by control 104 from an appropriate microprocessor control unit. In this manner, a desired amount of dry component (A) is fed through outlet 106 from feeder 102. Feeder 102 is a standard gravimetric feeder having an auger rotated at the speed determined by the signal on control line 104. The process disclosed in FIG. 8 is continuous, whereby the amount of dry component (A) directed to outlet 106 controls the ratio of component (A) to component (B). Liquid phase or component (B) is produced by introducing microcrystalline cellulose C into a high shear mixer 110. Water is added to the mixer and the high shear mixer is operated between 2-5 minutes at high speed to drastically masticate cellulose C producing extremely fine needle like particles with a size of less than one micron. After cellulose C is particulated into small particles, a delay unit 112 introduces the other liquids into mixer 110. These other liquids involve fruit puree, flavoring agents, coloring agents, salts, acids, preservatives and liquid sweeteners. If chocolate or caramel is to be used, instead of fruit puree, this substance is introduced in the mixer 110 after a time delay, represented as unit 112. A time delay is necessary to allow rapid high shear particulation or mastication of cellulose C before the other liquids forming component (A) are introduced into the cellulose/water solution in mixer 110. Pump 114 pumps the contents of mixer 110 to a holding tank 120 having a slow paddle for mixing the liquid phase. From holding tank 120 the liquid phase (B) is fed through a mass flow meter 130 to a second pump 132. In practice, two high shear mixers 110 are used so that one batch of the liquid component (B) is produced and deposited in holding tank 120 while another batch is being prepared. Of course, if the holding tank has sufficient capacity it is possible to use only a single high shear mixer. Pump 132 has an inlet 132a for receiving liquid component (B) from holding tank 120 as it is directed to outlet 122 and through flow meter 130. Outlet 132b directs component (B) at a rate determined by the velocity of motor 134, which is controlled by an error amplifier 140 having a first input 140a with a signal determined by the actual flow through meter 130. A set point, or desired flow, is provided by a microprocessor as a signal in input 140b of error amplifier 140. The outlet of the error amplifier controls the velocity of motor 134 and, thus, the speed of the pump 132 so the flow from outlet 132b is coordinated with the flow of component (A) in output line 106.

Figure 9:
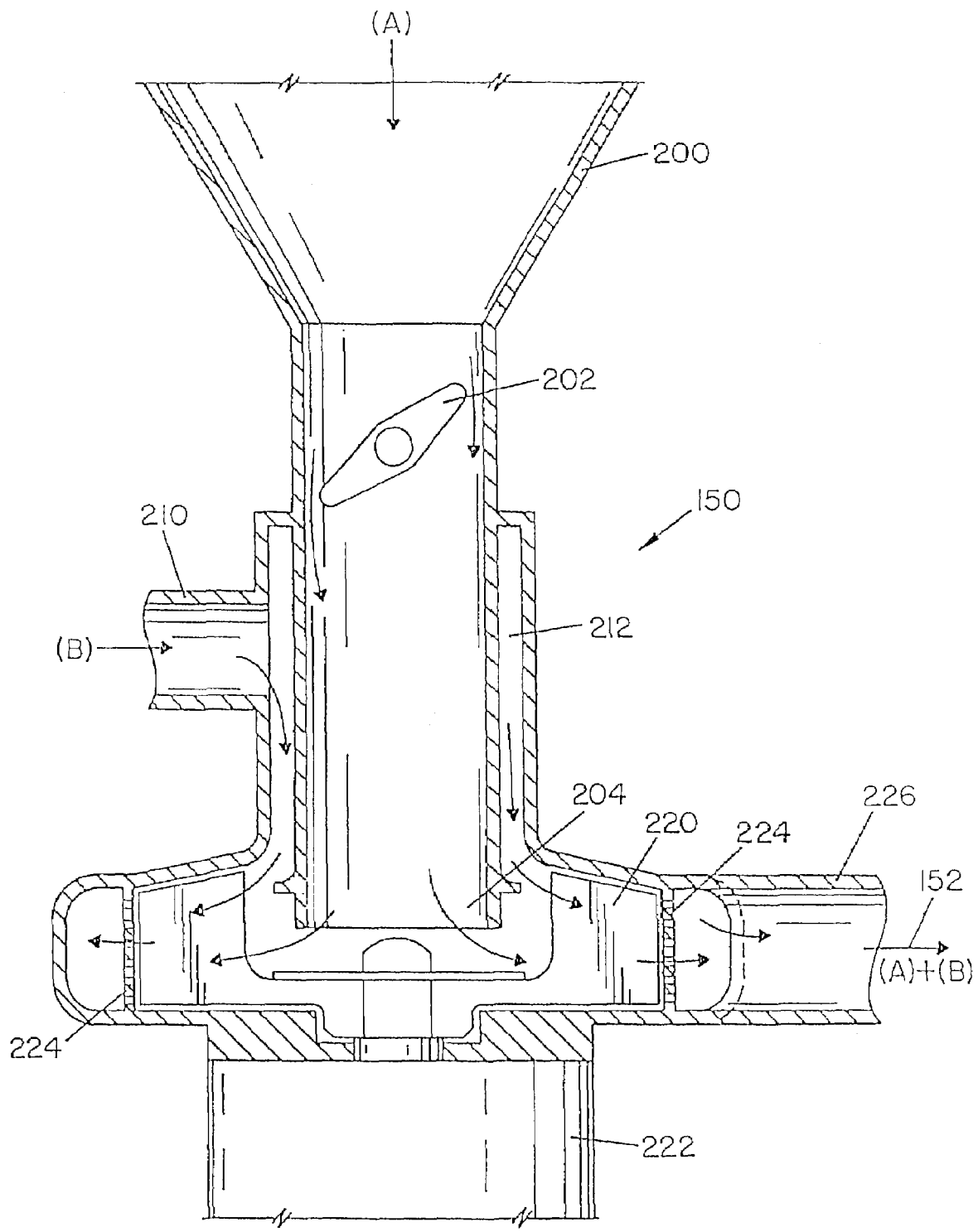
FIG. 9 is a side elevational, partially cross sectioned view of the blender used to ultra rapidly combine the dry component of FIG. 4 with the liquid component of FIG. 5 to produce the mixture of FIG. 6 by use of the method of the present invention.
Figure 10:
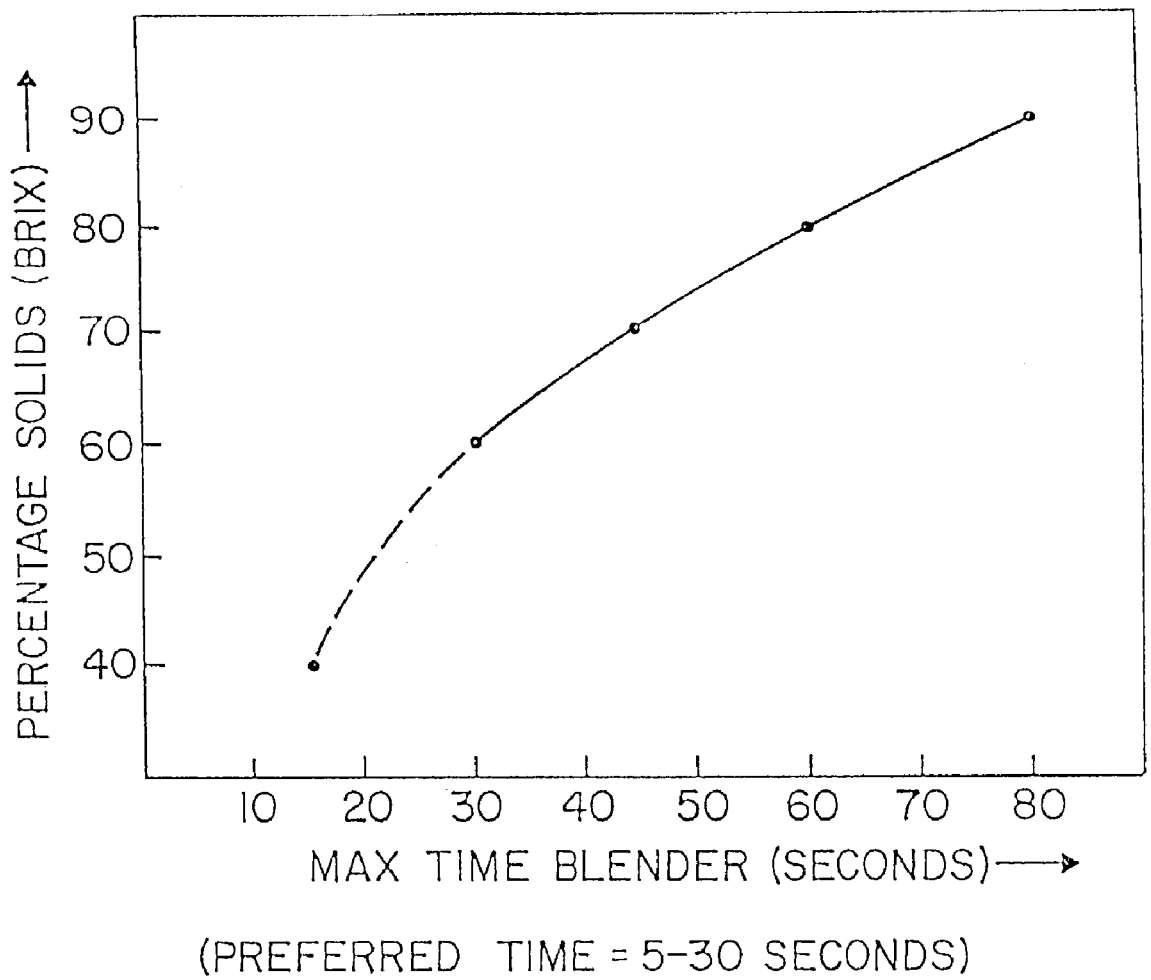
FIG. 10 is a graph representing the maximum time for blending the dry component and liquid component when using the method and making the formulation of the present invention.

These two components (A) and (B) are directed simultaneously and continuously to an ultra high speed blender 150 of the type schematically illustrated in FIG. 9 and shown in more detail in U.S. Pat. No. 3,606,270 incorporated by reference herein. Ultra high speed blender 150 disperses the dry component (A) into the liquid phase or component (B) before the free water in component (B) has time to set up the starch blend from mixer 100. The invention involves the rapid dispersion of component (A) in liquid component (B) before the starch blend can be hydrated. Thus, it is necessary to maintain a low water content in mixer 100 so component (A) remains dry, or at least substantially free of available water for hydrating starches S1 and S2 forming the starch blend stabilizing system. The mixed material, shown in FIG. 6 is pumped through line 152 to a packing station 160, where the paste is ultimately finalized by setting of starches S1, S2 after a full and thorough dispersion of the blend of starches of component (A) in the liquid phase or component (B). Ultra high speed blender 150, as shown in FIG. 9, includes a hopper 200 to receive the dry component (A). Butterfly valve 202 controls the flow of dry component (A) to outlet 204. Liquid phase or component (B) is introduced through inlet 210 into an annulus or passage 212. In this manner, dry component (A) is directed together with liquid component (B) to a rapidly rotating impeller 220 driven by a motor 222. The two components are immediately forced outwardly through a fine mesh screen 224 into a pressurized outlet 226 connected to line 152, as shown in FIG. 8. The ultra rapid mixer 150 is a "Tri-Blender" that disperses the powder or dry component (A) into the liquid component (B) at a high speed. In accordance with the invention, as illustrated in FIG. 10, the dispersion occurs in less than about 60 seconds. In practice, the dispersion step is accomplished in approximately 5-10 seconds. The preferred time of rapid dispersion is 10-30 seconds. As shown in the graph of FIG. 10, as the solids content increases, a slower dispersion rate can be used. This is due to the fact that there is less available or free water at the higher levels of solids. Starches S1 and S2 set up slower at higher solids levels. The present invention is particularly applicable for use in solids between 60-90%. At 60%, the maximum time for dispersion of the starch blend of component (A) into the liquid phase or component (B) is 30 seconds. The dispersion must be rapid. Dispersion at all solids content should be less than 60 seconds, and preferably less than 30 seconds. By rapid dispersion, as taught by the curve in FIG. 10, the blend of instant cold process starches S1, S2 can be used to produce a controlled consistency and bake stable paste 20. Examples of the present invention and other modifications of the invention will now be explained.

EXAMPLE 1

| INGREDIENT | WT (gms) | % SOLIDS | % SOLIDS/MIX |
|---|---|---|---|
| Water | 82.71 | 0 | 0 |
| Strawberry Puree | 27.20 | 29 | 0.78 |
| Glycerin | 52.50 | 99 | 5.22 |
| Sodium Citrate | 3.00 | 100 | 0.30 |
| Color WJ Red 40 Dustmaster 7704 | 0.40 | 100 | 0.04 |
| Carmel Coloring Sethness-Oz AP-100 | 3.00 | 65 | 0.20 |
| Avicel XP 3269 N | 5.00 | 100 | 0.50 |
| Strawberry Wonf-Drag 9/70P039 | 6.00 | 54 | 0.32 |
| Strawberry Wonf-Met MC-2722 | 1.00 | 64 | 0.06 |
| Sodium Benzoate | 0.50 | 100 | 0.05 |
| Potassium Sorbate (Granular) | 0.50 | 100 | 0.05 |
| Isosweet Corn Syrup 80% | 638.69 | 89 | 51.10 |
| Krystar 300 Cry Fructose | 50.00 | 100 | 5.00 |
| Salt | 3.00 | 100 | 0.30 |
| Citric Acid | 4.00 | 100 | 0.40 |
| Apple Powder 20 Mesh | 20.00 | 97 | 1.94 |
| MIRA-THIK 468 | 22.50 | 95 | 2.14 |
| MIRA GEL 463 | 10.00 | 95 | 0.95 |
| BINASOL 15 | 30.00 | 96 | 2.85 |
| REDI-TEX | 40.00 | 95 | 3.80 |
| TOTAL | 1000.00 | | 76.00 |

Figure 11:
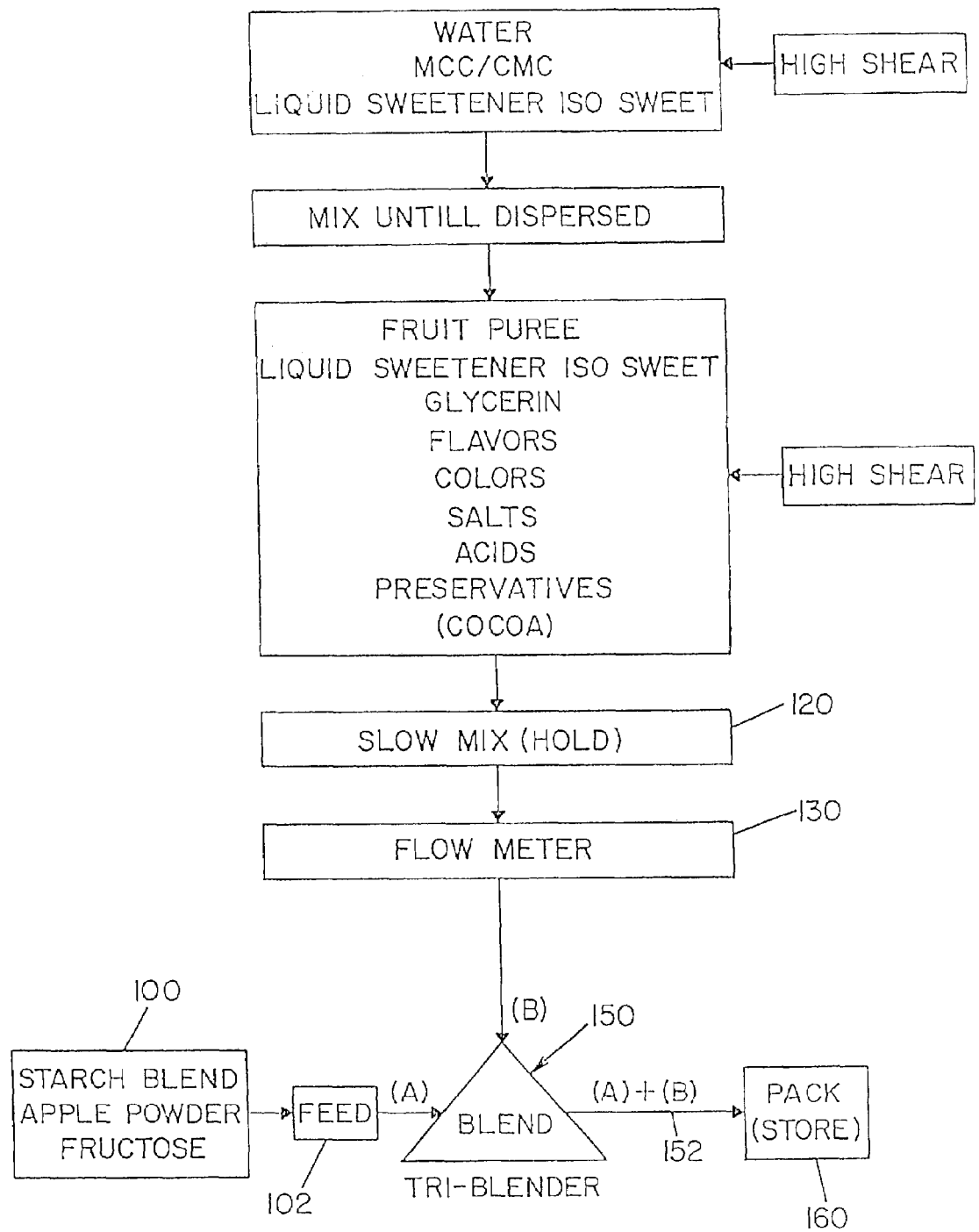
FIG. 11 is a flow chart and block diagram disclosing the method used in producing a food ingredient, filling and/or paste in accordance with the present invention including a cellulose component.
Figure 12:
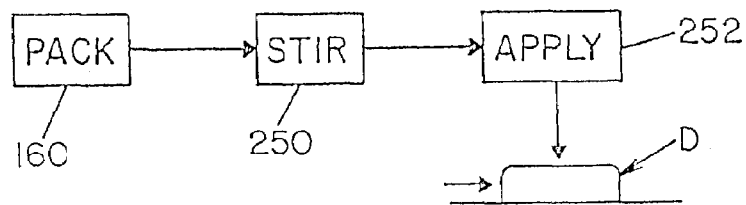
FIG. 12 is a flow chart and block diagram illustrating further processing of the food ingredient, filling and/or paste produced by using the method disclosed in FIG. 11.

Example I is a strawberry bar filling, formulated and processed according to the present invention. FIG. 11 generally illustrates the process used in formulating Example I. Paste 20 which is produced in accordance with Example I includes glycerin, which is a humectant, and sodium citrate, which is a pH buffer. Liquid coloring agents are introduced into liquid component (B). The MCC/CMC component is microcrystalline cellulose sold as AVICEL by F.M.C. Corporation. Sodium citrate and potassium sorbet are preservatives. The fructose is a dry form of sweetener. Citric acid is added to control taste, especially tartness. Apple powder is a bulking agent to produce bulk fiber, thus controlling texture. MIRA-THIK and MYRA-GEL are cold processed corn starches forming the blend constituting the stabilizing system employed in the present invention. BINASOL 15 and REDI-TEX control the texture of the paste 20. Referring now to FIG. 11, the procedure for forming paste 20 in accordance with Example I is illustrated. The water and cellulose (MCC/CMC) is added with a slight amount of liquid sweetener Isosweet. Cellulose and water are mixed for 2-5 minutes in extremely high shear to particulate the cellulose into small particles, generally less than one micron. This mixing operation continues until there is a fine dispersion of cellulose. Thereafter, fruit puree, liquid sweetener, humectant, flavors, colors, salts, acids and preservatives are combined with the highly particulated cellulose. The high shear operation continues in a high shear mixer 110, as shown in FIG. 8. Liquid component (B) may employ cocoa, instead of fruit puree if a chocolate taste is desired. Component (B) is slowly mixed in holding tank 120 and then passed through flow meter 130 to the ultra high speed blender 150. Starch blend, apple powder and dry fructose are combined in mixer 100, fed through the gravimetric feeder 102 into ultra high speed blender 150, where dry component (A) is rapidly dispersed in liquid component (B) to produce an unset, non-hydrated mixture of the two components, as represented in FIG. 6. Output line 152 of blender 150 is used to pump a mixture with starches S1, S2 dispersed in the liquid phase to packing station 160. In FIG. 12, packing station 160 allows starches S1, S2 to set as a combined starch matrix to the stabilizing system of paste 20. Paste 20 is stirred by dispenser 250 at the bakery. Paste 20 is pumpable and can be applied by applicator 252 onto a dough product D for subsequent baking. Some of the liquid sweetener (Isosweet) can be added with the cellulose for dispersing the cellulose in the water, as shown in FIG. 11. Since the starch, with fructose added tends to thicken, it is not held for a substantial time. The cellulose is approximately 0.3%-6.0% of the initial water/cellulose mixture, which is ultimately mixed at high shear for 2-5 minutes. The liquid sweetener is added to the water/cellulose solution as needed to provide an even dispersion of the cellulose in the water. The set up of starches S1, S2 in packing station 160 is generally at room temperature and it is stored in the set-up condition until transported to the bakery for use. Rapid dispersion of dry component (A) into the liquid component (B) is a critical aspect of the invention.

EXAMPLE II

| INGREDIENT | WT (gms) | % SOLIDS | % SOLID/MIX |
|---|---|---|---|
| Water | 65.6 | 0 | 0 |
| Isosweet Corn Syrup 80% | 676.74 | 80 | 54.14 |
| Glycerin | 30.00 | 99 | 2.98 |
| Cocoa-Dezaan D-21-S | 41.67 | 97 | 4.04 |
| Neto Corn Syrup (Karo) | 120.00 | 81 | 9.69 |
| Titanium Dioxide (Liquid) | 3.00 | 50 | .15 |
| Salt | 3.00 | 100 | .30 |
| Modified Instant Granular Starch (Thickening) (MIRA-THIK 468 | 50.00 | 95 | 4.75 |
| Natural Instant Granular Starch (Gelling) MIRAGEL 463 | 10.00 | 95 | 0.95 |
| Total | 1000.00 | | 77 |

Figure 13:
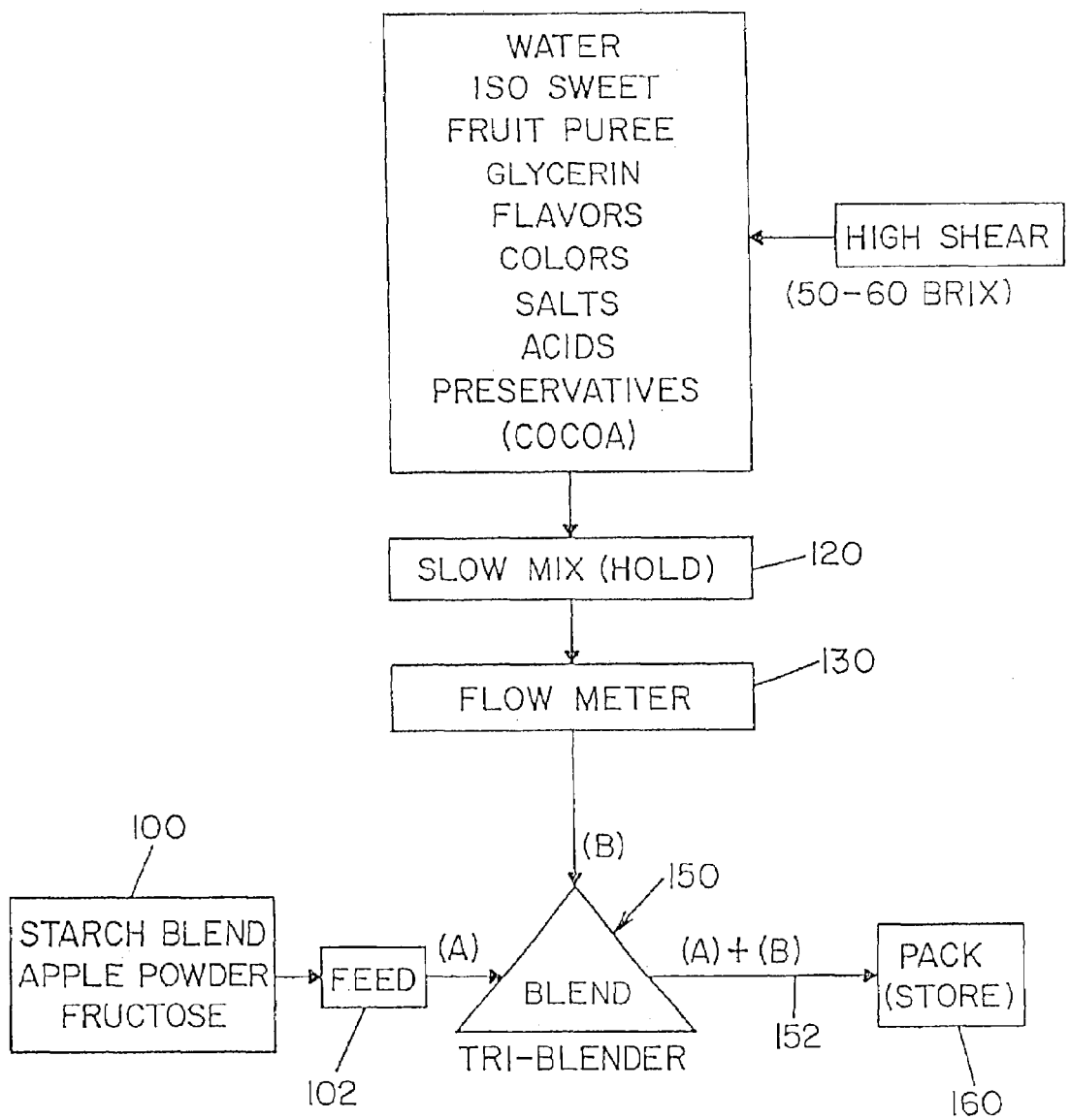
FIG. 13 is a flow chart and block diagram illustrating a method for producing a food ingredient, filling or paste in accordance with the present invention which differs from the flow chart and block diagram of FIG. 11 because the formulation does not include a cellulose component.

Example II is a chocolate base paste having a solids content of 77% and using a thickening starch and a gelling starch in accordance with the present invention. In this example, there is no cellulose to increase cohesion of the paste and the bake stability of the paste. This example produces a paste for use inside a cookie bar. The high solids content decreases the tendency for water to migrate into the baked product. The titanium dioxide adds color and there is a substantially greater amount of the thickening corn starch, than gelling starch. This produces a pudding type stabilized paste. The consistency of the paste 20 is controlled by the ratio of the gelling starch to the filling starch. However, these starches must still be processed in accordance with the present invention so that there is full dispersion of the starches in the liquid phase or component (B) prior to hydration of the starches by the available free water. FIG. 13 illustrates the process used in producing a filling, paste or other food ingredient as represented by Example II. This method differs from the method in FIG. 11. The high shear mixing step does not include premixing and prior particulation of cellulose in water. Liquid component (B) includes the water, sweetener, humectant, flavors, colors, a pH control agent and preservatives, with either a fruit puree or a chocolate or caramel flavor constituent. Example II is used for producing a chocolate paste. In FIG. 13, the liquid component (B) has a brix of between 50-60. In mixer 100, dry starches, apple powder and possibly dry fructose are combined to produce a component (A) with a solids content of approaching 100%. These components (A) and (B) are mixed to produce a final paste having the desired solids content. The rapid blending step effected by blender 150 produces a paste pumped through outlet 152 to packing station 160.

Figure 14:
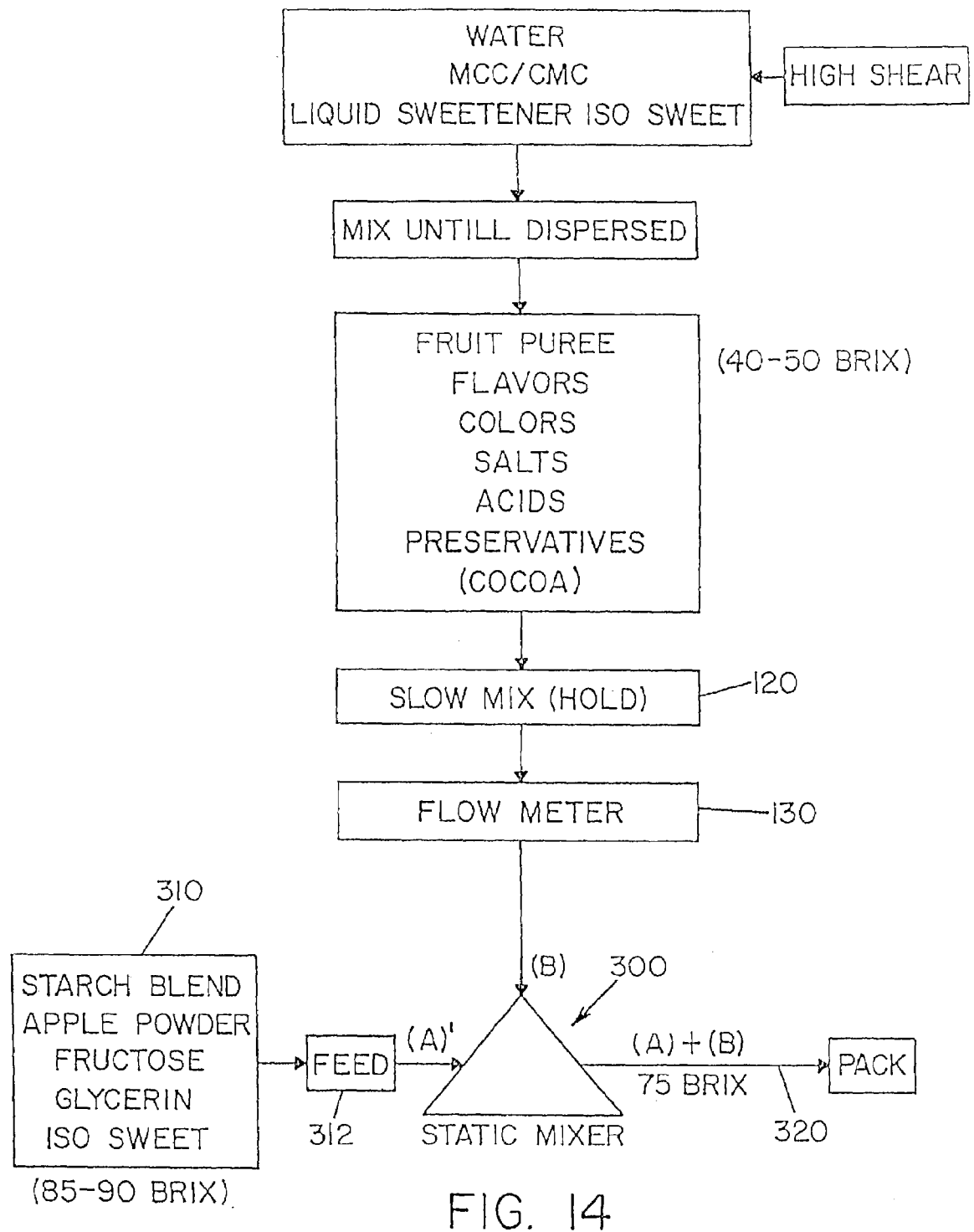
FIG. 14 is a flow chart and block diagram disclosing a method for producing a food ingredient, filling or paste in accordance with the present invention, wherein the stabilizing system is liquefied, but without a substantial amount of free water; and, FIG. 15 is a side elevational, partially cross sectional view schematically illustrating a static mixer of the type employed in the method disclosed in FIG. 14.
Figure 15:
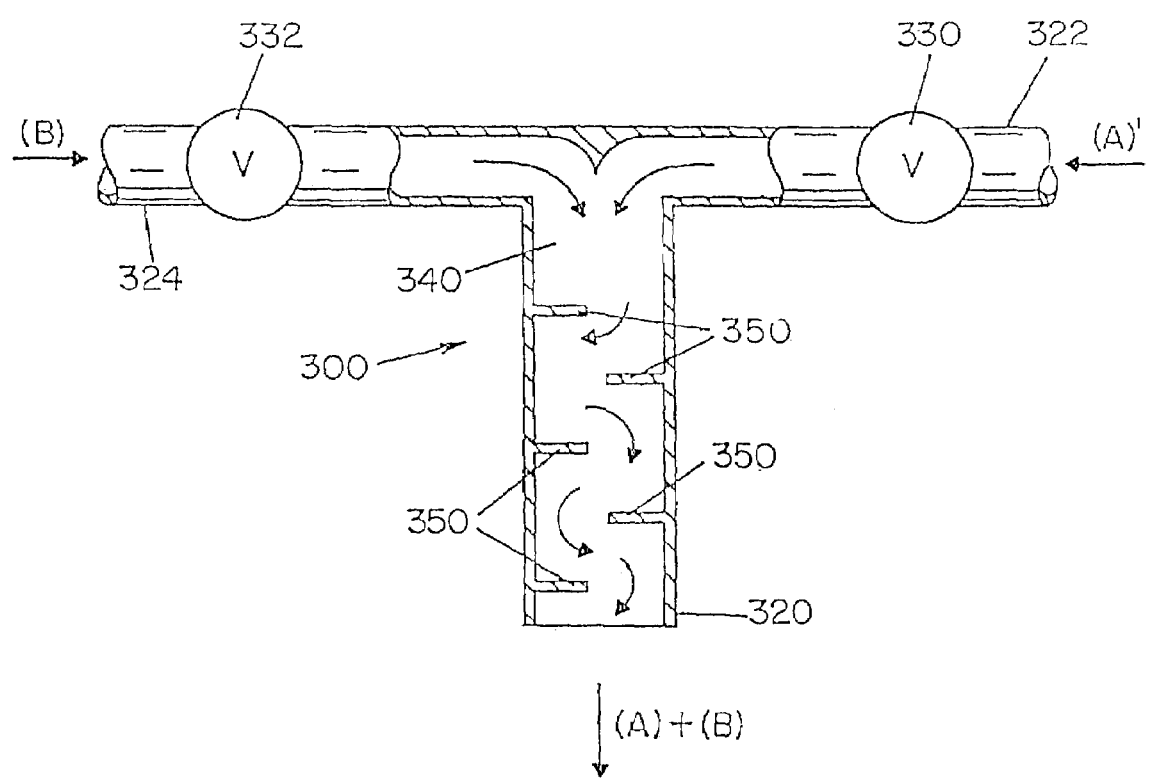

Referring again to Example I, an alternative method of producing a fruit paste is shown in FIG. 14. Components (A)' and (B) are both liquid phases. The ultra high speed blender 150 is replaced with a static blender 300, schematically illustrated in FIG. 15. By the method disclosed in FIG. 14, component (B) is formed in accordance with the cold process technology shown in FIG. 11. Liquid component (B) has a brix of 40-50. To convert dry component (A) into a liquid phase, the liquid sweetener used in the liquid phase is now combined with the dry starches, as indicated in block 310. Since the corn syrup liquid sweetener is liquid, the starch blend, apple powder and fructose is converted to a liquid phase, (A)'. Isosweet contains 80% solids; therefore, there is free water a slight amount of free water introduced into block 310 in the form of corn syrup. To counteract the effect of the free water from the liquid corn syrup, a humectant in the form of glycerin is added. In this manner, there is substantially no free water in block 310 to cause the dry starches to set up or hydrogenate prematurely. Consequently, the liquid phase (A)$^1$ from block 310 is still substantially free of water and is fed by an appropriate liquid feeding device 312 to the static mixer 300. Combining the low brix component (B) with the high brix component (A)$^1$ produces a high solids content to the outlet 320 of static mixer 300. A variety of static mixers could be used; however, representative static mixer is illustrated in FIG. 15. Liquid phases (A)$^1$ and (B) are introduced through inlet 322,324, respectively. Valves 330 and 332 control the ratio of components (A)' and (B). The two components are maintained separately from each other until mixing at area 340. A plurality of axially spaced baffles 350 rapidly mix the components (A)$^1$ and (B) in the same manner as the rapid dispersion occurred in blender 150. The use of two liquid components allows continuous processing of this novel paste. A liquid phase for the starches is used only for pastes having a high solids content. As shown in FIG. 10, a slightly longer time is allowed for even dispersion of the starches in the paste before the starches are set. The method disclosed in FIGS. 14 and 15 is not the preferred method for practicing the present invention but is illustrated for the purposes of representing an alternative procedure for maintaining the starches in an inactive condition prior to rapid mixing with liquid phase (B).

Having thus defined the invention, the following is claimed:

1. A thickened and gelled food filling being made by combining:
   a. a flavoring agent;
   b. water; and
   c. a starch blend containing:
      i. a modified starch capable of thickening when contacted with cold water, and
      ii. a natural starch capable of gelling when contacted with cold water;

the food filling being made without substantial heating but with substantial mixing so that the modified starch and the natural starch each substantially disperse in water before being hydrated;
   wherein a disk of the food filling measuring 36 mm in diameter and 8 mm thick exhibits a droop of no more than about 5% after being heated to a temperature of 400° F. for 10 minutes.

2. The food filling of claim 1, having a solids content of at least 60%.

3. The food filling of claim 2, having a solids content of about 60-90%.

4. The food filling of claim 1, wherein the natural starch constitutes at least 10 weight percent of the starch blend.

5. The food filling of claim 4, wherein the natural starch constitutes about 10-40 weight percent of the starch blend.

6. The food filling of claim 1, wherein the modified starch is a modified cold-water thickening corn starch and the natural starch is a natural cold-water gelling corn starch.

7. The food filling of claim 6, wherein the modified cold-water thickening corn starch has a moisture content of less than about 8 percent and a pH of about 4.0-6.5.

8. The food filling of claim 7, wherein the natural cold-water gelling corn starch has a moisture content of less than about 8 percent and a pH of about 4.0-6.5.

9. The food filling of claim 8, wherein the natural cold-water gelling corn starch constitutes about 10-40 weight percent of the starch blend.

10. The food filling of claim 9, having a solids content of about 60-90 %.

11. The food filling of claim 1, wherein the flavoring agent is selected from the group consisting of fruit, fruit puree, cocoa, chocolate, caramel, and mixtures thereof.

12. The food filling of claim 1, further comprising microcrystalline cellulose.

13. The food filling of claim 1, further comprising a bulking agent.

14. The food filling of claim 13, wherein the bulking agent is selected from the group consisting of dry fructose, fruit powder, and mixtures thereof.

15. The food filling of claim 1, further comprising a humectant.

16. The food filling of claim 15, wherein the humectant is glycerin.

17. The food filling of claim 1, further comprising a sweetener.

18. The food filling of claim 17, wherein the sweetener is corn syrup.

19. The food filling of claim 1, further comprising one or more texture control starches.

20. The food filling of claim 1, further comprising an additive selected from the group consisting of a coloring agent, a pH buffer, a preservative, and mixtures thereof.

21. The food filling of claim 1:
   wherein the flavoring agent is strawberry puree and comprises about 2-3% of the food filling;
   wherein the water comprises about 8-9% of the food filling; and
   wherein the starch blend comprises about 3-4% of the food filling, and a modified cold-water thickening corn starch constitutes about 68-70 weight percent of the starch blend and a natural cold-water gelling starch constitutes about 30-32 weight percent of the starch blend;
   the food filling further comprising:
      about 0-1% microcrystalline cellulose;
      about 2% apple powder;
      about 5% dry fructose;

about 5-6% glycerin;
about 51-52% corn syrup; and
about 7% of one or more texture control starches.

22. The food filling of claim 1:
wherein the flavoring agent is cocoa and comprises about 4-5% of the food filling;
wherein the water comprises about 6-7% of the food filling; and
wherein the starch blend comprises about 6% of the food filling, and a modified cold-water thickening corn starch constitutes about 82-84 weight percent of the starch blend and a natural cold-water gelling corn starch constitutes about 16-18 weight percent of the starch blend;
the food filling further comprising:
about 3% glycerin; and
about 66-67% corn syrup.

23. A thickened and gelled food filling being made by combining:
a. a flavoring agent;
b. water; and
c. a starch blend containing:
  i. a modified corn starch capable of thickening when contacted with cold water, and
  ii. a natural corn starch capable of gelling when contacted with cold water;
the food filling being made without substantial heating but with substantial mixing so that the modified corn starch and the natural corn starch each substantially disperse in water before being hydrated;
wherein hydration of the modified corn starch and the natural corn starch without substantial heating causes the food filling to develop a viscosity which remains substantially unaffected by subsequent heating to elevated temperature; and
wherein a disk of the food filling measuring 36 mm in diameter and 8 mm thick exhibits a droop of no more than about 5% after being heated to a temperature of 400° F. for 10 minutes.

24. The food filling of claim 23, having a solids content of at least 60%.

25. The bake stable filling of claim 24, having a solids content of about 60-90%.

26. The food filling of claim 23, wherein the natural corn starch constitutes at least 10 weight percent of the starch blend.

27. The food filling of claim 26, wherein the natural corn starch constitutes about 10-40 weight percent of the starch blend.

28. The food filling of claim 23, wherein the modified corn starch is a modified cold-water thickening corn starch having a moisture content of less than about 8 percent and a pH of about 4.0-6.5.

29. The food filling of claim 28, wherein the natural corn starch is a natural cold-water gelling corn starch having a moisture content of less than about 8 percent and a pH of about 4.0-6.5.

30. The food filling of claim 29, wherein the natural cold-water gelling corn starch constitutes about 10-40 weight percent of the starch blend.

31. The food filling of claim 30, having a solids content of about 60-90%.

32. The food filling of claim 23, wherein the flavoring agent is selected from the group consisting of fruit, fruit puree, cocoa, chocolate, caramel, and mixtures thereof.

33. The food filling of claim 23, further comprising microcrystalline cellulose.

34. The food filling of claim 23, further comprising a bulking agent.

35. The food filling of claim 34, wherein the bulking agent is selected from the group consisting of dry fructose, fruit powder, and mixtures thereof.

36. The food filling of claim 23, further comprising a humectant.

37. The food filling of claim 36, wherein the humectant is glycerin.

38. The food filling of claim 23, further comprising a sweetener.

39. The food filling of claim 38, wherein the sweetener is corn syrup.

40. The food filling of claim 23, further comprising one or more texture control starches.

41. The food filling of claim 23, further comprising an additive selected from the group consisting of a coloring agent, a pH buffer, a preservative, and mixtures thereof.

42. The food filling of claim 23:
wherein the flavoring agent is strawberry puree and comprises about 2-3% of the food filling;
wherein the water comprises about 8-9% of the food filling; and
wherein the starch blend comprises about 3-4% of the food filling, and a modified cold-water thickening corn starch constitutes about 68-70 weight percent of the starch blend and a natural cold-water gelling starch constitutes about 30-32 weight percent of the starch blend;
the food filling further comprising:
about 0-1% microcrystalline cellulose;
about 2% apple powder;
about 5% dry fructose;
about 5-6% glycerin;
about 51-52% corn syrup; and
about 7% of one or more texture control starches.

43. The bake stable filling of claim
wherein the flavoring agent is cocoa and comprises about 4-5% of the food filling;
wherein the water comprises about 6-7% of the food filling; and
wherein the starch blend comprises about 6% of the food filling, and a modified cold-water thickening corn starch constitutes about 82-84 weight percent of the starch blend and a natural cold-water gelling corn starch constitutes about 16-18 weight percent of the starch blend;
the food filling further comprising:
about 3% glycerin; and
about 66-67% corn syrup.

* * * * *

UNITED STATES PATENT AND TRADEMARK OFFICE
CERTIFICATE OF CORRECTION

PATENT NO.         : 7,455,870 B2                                    Page 1 of 1
APPLICATION NO. : 10/375568
DATED              : November 25, 2008
INVENTOR(S)       : Jonathan D. Rock and John P. Hansen It is certified that error appears in the above-identified patent and that said Letters Patent is hereby corrected as shown below:

Column 1, line 5, before "application" please insert -- This --.

Claim 43, Column 18, line 43, after "claim" please insert -- 23 --.

Signed and Sealed this

Thirteenth Day of January, 2009

JON W. DUDAS
*Director of the United States Patent and Trademark Office*